US006332086B2

(12) United States Patent
Avis

(10) Patent No.: US 6,332,086 B2
(45) Date of Patent: *Dec. 18, 2001

(54) DISCONTINUOUS RECEIVE OPERATION IN A WIRELESS TERMINAL

(76) Inventor: Graham Avis, 13002 Maritime Pl., San Diego, CA (US) 92130

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/835,338

(22) Filed: Apr. 7, 1997

(51) Int. Cl.$^7$ ................................................. H04Q 7/20
(52) U.S. Cl. .......................... 455/574; 455/70; 340/7.32
(58) Field of Search .................... 455/13.2, 13.3, 455/13.4, 343, 427, 428, 430, 502, 507, 517, 574, 552, 38.2, 38.3, 70, 88, 522; 370/310, 345, 350, 311, 553; 375/356; 340/825.5, 7.32–7.37; 342/357.01, 357.06, 357.07, 357.1, 357.12; 701/49, 207, 213

(56) References Cited

U.S. PATENT DOCUMENTS

| | | | | |
|---|---|---|---|---|
| 4,449,248 | * | 5/1984 | Leslie et al. ........................... | 455/343 |
| 4,701,760 | | 10/1987 | Raoux .................... | 340/993 |
| 5,222,245 | * | 6/1993 | Ando et al. ............................ | 455/13.2 |
| 5,319,374 | | 6/1994 | Desai et al. ............................ | 342/387 |
| 5,347,562 | * | 9/1994 | Candy ..................... | 455/70 |
| 5,388,102 | * | 2/1995 | Griffith et al. ........................ | 370/512 |
| 5,402,424 | * | 3/1995 | Kou ...................................... | 455/13.2 |
| 5,416,808 | * | 5/1995 | Witsaman et al. ................... | 455/503 |
| 5,477,228 | * | 12/1995 | Tiwari et al. ......................... | 342/357 |
| 5,509,015 | * | 4/1996 | Tiedemann, Jr. et al. ............ | 370/311 |
| 5,537,685 | * | 7/1996 | Matsuno ................................ | 455/502 |
| 5,561,701 | * | 10/1996 | Ichikawa ............................... | 455/502 |
| 5,572,204 | * | 11/1996 | Timm et al. .......................... | 340/988 |
| 5,590,396 | * | 12/1996 | Henry .................................... | 455/426 |
| 5,625,668 | * | 4/1997 | Loomis et al. ........................ | 342/457 |
| 5,625,882 | * | 4/1997 | Wook et al. .......................... | 340/7.34 |
| 5,636,243 | * | 6/1997 | Tanaka .................................. | 370/311 |
| 5,654,815 | * | 8/1997 | Bunse .................................... | 359/110 |
| 5,669,061 | * | 9/1997 | Schipper ............................... | 455/429 |
| 5,712,867 | * | 1/1998 | Yokev et al. ......................... | 455/38.1 |
| 5,722,080 | * | 2/1998 | Kondo ................................... | 455/502 |
| 5,722,081 | * | 2/1998 | Tamura ................................. | 455/502 |
| 5,742,233 | * | 4/1998 | Hoffman et al. ..................... | 340/573 |
| 5,777,580 | * | 7/1998 | Janky et al. .......................... | 342/457 |
| 5,784,368 | * | 7/1998 | Weigand et al. ..................... | 455/502 |
| 5,790,939 | * | 8/1998 | Malcolm et al. .................... | 455/13.2 |

(List continued on next page.)

OTHER PUBLICATIONS

SAE Paper 861059 "Global Positioning System for Vehicle Navigation and Position Reporting" by G.F. Knoernschild.

Primary Examiner—Tracy Legree
Assistant Examiner—Jean A. Gelin
(74) Attorney, Agent, or Firm—John T. Whelan; Michael W. Sales

(57) ABSTRACT

An approach for synchronizing operation of a first communications terminal with operation of a second communications terminal involves establishing a communications link between the first communications terminal and the second communications terminal, the communications link being defined by a communication standard; and synchronizing a first clock coupled to the first communications terminal with a second clock coupled to the second communications terminal by receiving a time standard signal into the first communications terminal independently of the communication standard. This approach can be implemented using a first clock; a first communications terminal coupled to the first clock; a second clock; a second communications terminal coupled to the second clock; a communications link defined by a communication standard; and a transmitter transmitting a time standard signal independently of the communication standard to the first clock and setting the first clock in response to the time standard signal.

28 Claims, 4 Drawing Sheets

U.S. PATENT DOCUMENTS

| | | | |
|---|---|---|---|
| 5,809,426 | * | 9/1998 | Radojevic et al. .................. 455/502 |
| 5,842,146 | * | 11/1998 | Shishido ............................. 340/988 |
| 5,854,605 | * | 12/1998 | Gildea ................................. 342/357 |
| 5,870,673 | * | 2/1999 | Haartsen ............................. 455/462 |
| 5,895,436 | * | 4/1999 | Savoie et al. ....................... 701/214 |
| 5,918,180 | * | 6/1999 | Dimino ............................... 455/456 |
| 5,963,846 | * | 10/1999 | Kurby ................................. 455/12.1 |
| 5,991,279 | * | 11/1999 | Haugli et al. ....................... 455/311 |
| 6,016,322 | * | 1/2000 | Goldman ............................ 370/508 |
| 6,169,497 | * | 1/2001 | Robert ................................. 340/988 |
| 6,236,674 | * | 5/2001 | Morelli et al. ...................... 455/732 |

* cited by examiner

DISCONTINUOUS RECEIVE OPERATION IN A WIRELESS TERMINAL

BACKGROUND OF THE INVENTION

The present invention relates to the synchronization of a central station with a communications device, and more specifically, such synchronization wherein a communication standard through which the communications device communicates with base station infrastructure is not utilized to achieve such synchronization, but rather such synchronization is independent of the communication standard, whereby modification of the communication standard and the base station infrastructure is unnecessary in order to achieve such synchronization.

Recently, technologies have been developed wherein a remotely-located device such as an automobile, can be controlled from a central station through the use of a communications device, and an appropriate interface at the remotely-located device. In this way, features such as unlocking the doors of the automobile can be achieved from a central station, should the operator of the vehicle forget his/her keys in the automobile. One such system to implement this new technology is the ON-STAR System now available with automobiles made by General Motors.

Problematically, even communications devices such as hand-held portable cellular telephones, which are generally designed to be optimized for maximum battery life, draw too much current from an automobile's battery to be left operative for an extended period of time, such as a period of a day or more. Thus, it is highly desirable to deactivate the communications device most of the time, activating it only for brief periods during which it can monitor a communication channel for incoming pages, i.e. calls.

Problematically, during periods when the communications device is deactivated, and thus conserving battery life, incoming pages from base station infrastructure will be ignored. Thus, a mechanism must be employed to assure that at least some of such pages are initiated by the central station during periods when the communications device is active.

For example, one approach to assuring that pages destined for a particular mobile station are sent while such particular mobile station is active is to use the existing base station infrastructure and a communications standard associated therewith to synchronize operation of the central station and the mobile station. This can be done, for example, by defining a protocol for a control channel that directs the communications device as to when it should activate and deactivate. In such an arrangement, because the base station infrastructure is aware of the communications device's activate/deactivate cycling, having instructed the communications device as to when to activate and when to deactivate, the base station infrastructure can pass this information on to the central station and can assure that pages are sent only when the communications device is active.

Alternatively, the base station infrastructure may simply hold pages from the central station in a queue until the base station infrastructure determines that the communications device should be activated.

Unfortunately, these approaches require the establishment of a protocol for a control channel in the communication channel used by the base station infrastructure and the communications device so as to provide for methods of instructing the communications device as to the timing of its activate/deactivate cycling and to enable the base station infrastructure to communication this activate/deactivate cycling to the central station or to queue up pages until the communications device is to become activated. Problematically, the modification of existing protocols for the base station infrastructure requires modification of the communication standard employed, by the base station infrastructure, which presents both technical as well as political challenges.

The present invention advantageously addresses the above and other needs.

SUMMARY OF THE INVENTION

The present invention advantageously addresses the needs above as well as other needs by providing a system and method for the synchronization of a central station with a communications device, and more specifically, such a system and method for synchronization wherein a communication standard through which the communications device communicates with base station infrastructure is not utilized to achieve such synchronization, but rather wherein a synchronization approach independent of the communication standard is employed, whereby modification of the communication standard and the base station infrastructure is unnecessary in order to achieve such synchronization.

In one embodiment, the present invention can be characterized as a method of synchronizing operation of a first communications terminal with operation of a second communications terminal involving establishing a communications link between the first communications terminal and the second communications terminal, the communications link being defined by a communication standard; and synchronizing a first clock coupled to the first communications terminal with a second clock coupled to the second communications terminal by receiving a time standard signal into the first communications terminal independently of the communication standard.

In another embodiment the present invention can be characterized as a system for synchronizing a first clock with a second clock employing the first clock; a first communications terminal coupled to the first clock; the second clock; a second communications terminal coupled to the second clock; a communications link defined by a communication standard; and a transmitter transmitting a time standard signal independently of the communication standard to the first clock and setting the first clock in response to the time standard signal.

In a further embodiment the present invention can be characterized as a communications system having a communications transceiver; a controller coupled to the transceiver; a clock coupled to the controller, the controller powering on and powering off the communications transceiver in response to the clock; and a time standard receiver, independent of the communications transceiver, receiving a time standard signal and setting the clock in response to the time standard signal.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
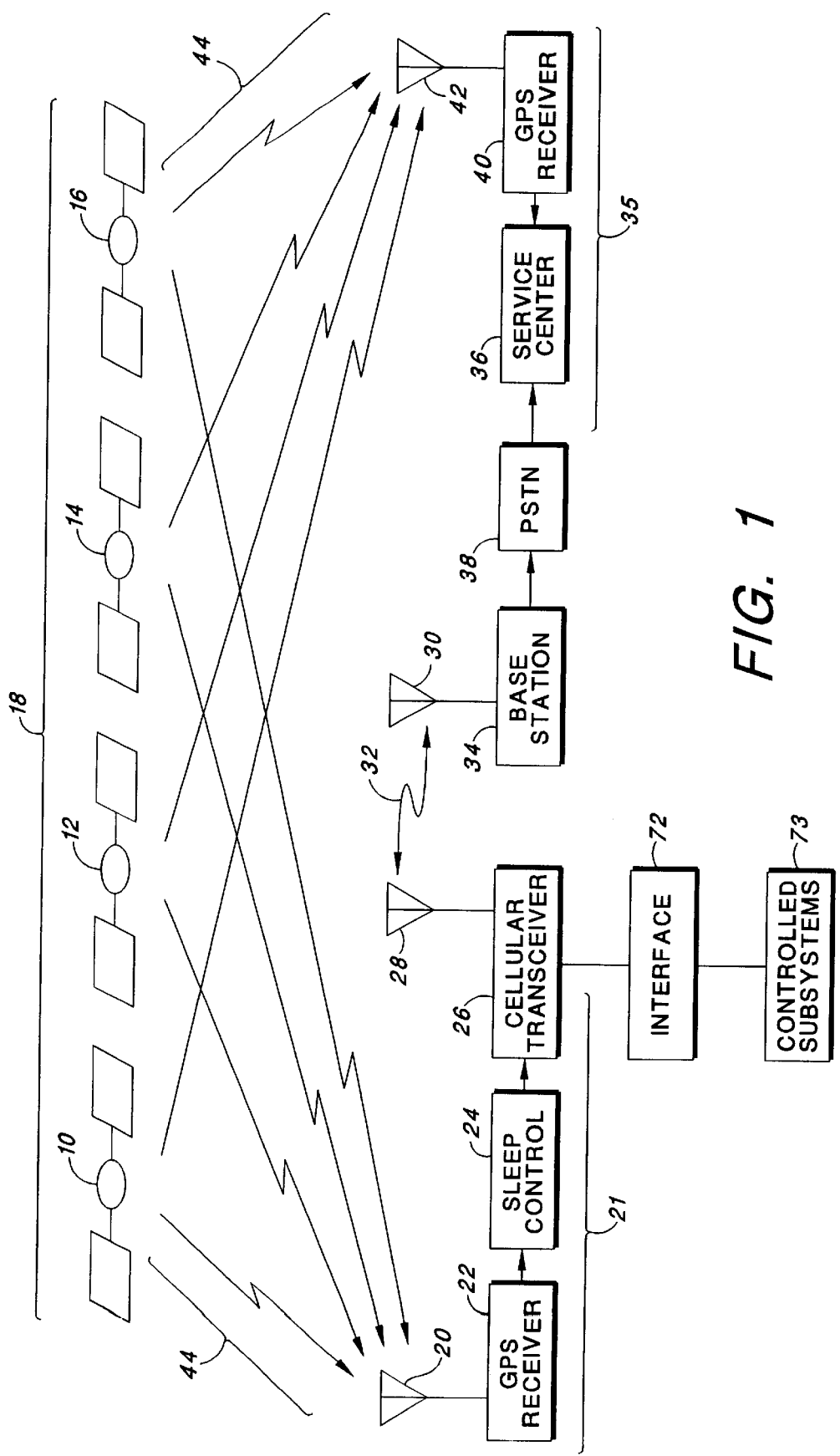
FIG. 1 is a functional block diagram of a communications device, interface, controlled system, GPS satellite array, base station infrastructure, public switched telephone network and central station employing a synchronization approach in accordance with one embodiment of the present invention.

Referring first to FIG. 1, a functional block diagram is shown of a system in accordance with one embodiment of the present invention. Shown are four (GPS) transmitter satellites 10, 12, 14, 16 forming a GPS array 18. Also shown is a first GPS antenna 20 and first GPS receiver 22 coupled to a sleep controller 24, which is coupled to a cellular transceiver 26 and cellular transceiver antenna 28. The first GPS receiver 22, sleep controller 24 and cellular transceiver together make up a communications device 21. A base station antenna 30 that communicates with the cellular transceiver antenna 28 through a cellular communication channel 32 is coupled to a base station infrastructure 34. The base station infrastructure 34 is coupled to a service center 36 via a public switched telephone network (PSTN) 38. The service center 36 is, in turn, coupled to a second GPS receiver 40 and a second GPS antenna 42. The service center 36 together with the second GPS receiver 40 make up a central station 35.

The cellular transceiver 26 is coupled to an interface 72, which is in turn coupled to controlled subsystems 73, such as power door locks on an automobile. Through the interface 72, the cellular transceiver 26 can be used to remotely control (by way of appropriate command signals from the central station 35) operation of, for example, the power door locks of the automobile. The interface 72 may be of the type now employed by General Motors in the OnStar system now available with some of it's automobiles.

In operation, normal cellular communications take place through the cellular communication channel 32 between the cellular transceiver antenna 28 and the base station antenna 30. Such communications are in a manner well known in the art and preferably in accordance with the AMPS, NAMPS or other cellular or wireless communication standards.

The first GPS receiver 22 receives signals from the GPS array 18 via the first antenna 20 and a GPS spacelink 44, including a time standard signal from which the GPS transceiver 22 is able to determine a time reference. The time standard signal is included in normal GPS transmissions and thus no modification to the GPS array 18 is required for use with the present invention. The time standard signal is passed to the sleep controller 24, which algorithmatically determines an appropriate sleep schedule (i.e., activate/deactivate cycle) for the cellular transceiver 26. For example, the sleep controller 24 may determine an activate/deactivate cycle for the cellular transceiver 26 as a function of the time standard signal from the GPS receiver 22 and of a station identification number (STID) assigned to the cellular transceiver 26. For example, the sleep schedule for the cellular transceiver 26 may be one minute activated, followed by ten minutes deactivated, so as to define a ten minute cycle during which the cellular transceiver is activated for one minute and deactivated for nine minutes. Thus, for example, during each hour of operation the cellular transceiver may be activated from five minutes to six minutes passed the hour, fifteen minutes to sixteen minutes passed the hour, twenty-five minutes to twenty-six minutes passed the hour, thirty-five minutes to thirty-six minutes passed the hour, forty-five minutes to forty-six minutes passed the hour and fifty-five minutes to fifty-six minutes passed the hour.

GPS signals from the GPS array 18, including the time standard signal, are also transmitted via the GPS spacelink 44 to the second GPS antenna 42 and second GPS receiver 40. Based on the station identification number for the cellular transceiver 26, and a time standard signal from the second GPS receiver 40, the service center 36 is able to determine periods during which the cellular transceiver 26 will be activated, and periods during which the cellular transceiver 26 will be deactivated. Advantageously, such determination is made completely independently of the cellular communication channel 32 between the cellular transceiver 26 and the base station infrastructure 34, and furthermore, completely independently of the base station infrastructure 34.

As a result of this cellular communication channel 32 and base station infrastructure 34 independence, the teachings of the present embodiment provide for synchronization the activate/deactivate cycle 36 of the cellular transceiver 26 with the initiation of transmissions via the cellular communication channel 32 by the service center 36 without a need to modify the cellular protocols utilized across the cellular communication channel 32 or otherwise involve the cellular communication channel 32 or the base station infrastructure 34.

Various modifications such as are discussed hereinbelow may advantageously be made to the cellular transceiver 26 in order to operate in accordance with the teachings of the present embodiment, however, these modifications do not require alteration of the communication standards used over the cellular communication channel 32 or of the base station infrastructure 34. Instead, an entirely independent and readily available channel, i.e., the GPS spacelink 44, is utilized to synchronize the activate/deactivate cycles of the cellular transceiver 26 with the initiation of transmissions from the service center 36. Advantageously, the GPS spacelink 44 is known to carry an accurate time standard built into its transmissions by the GPS array 18.

Figure 2:
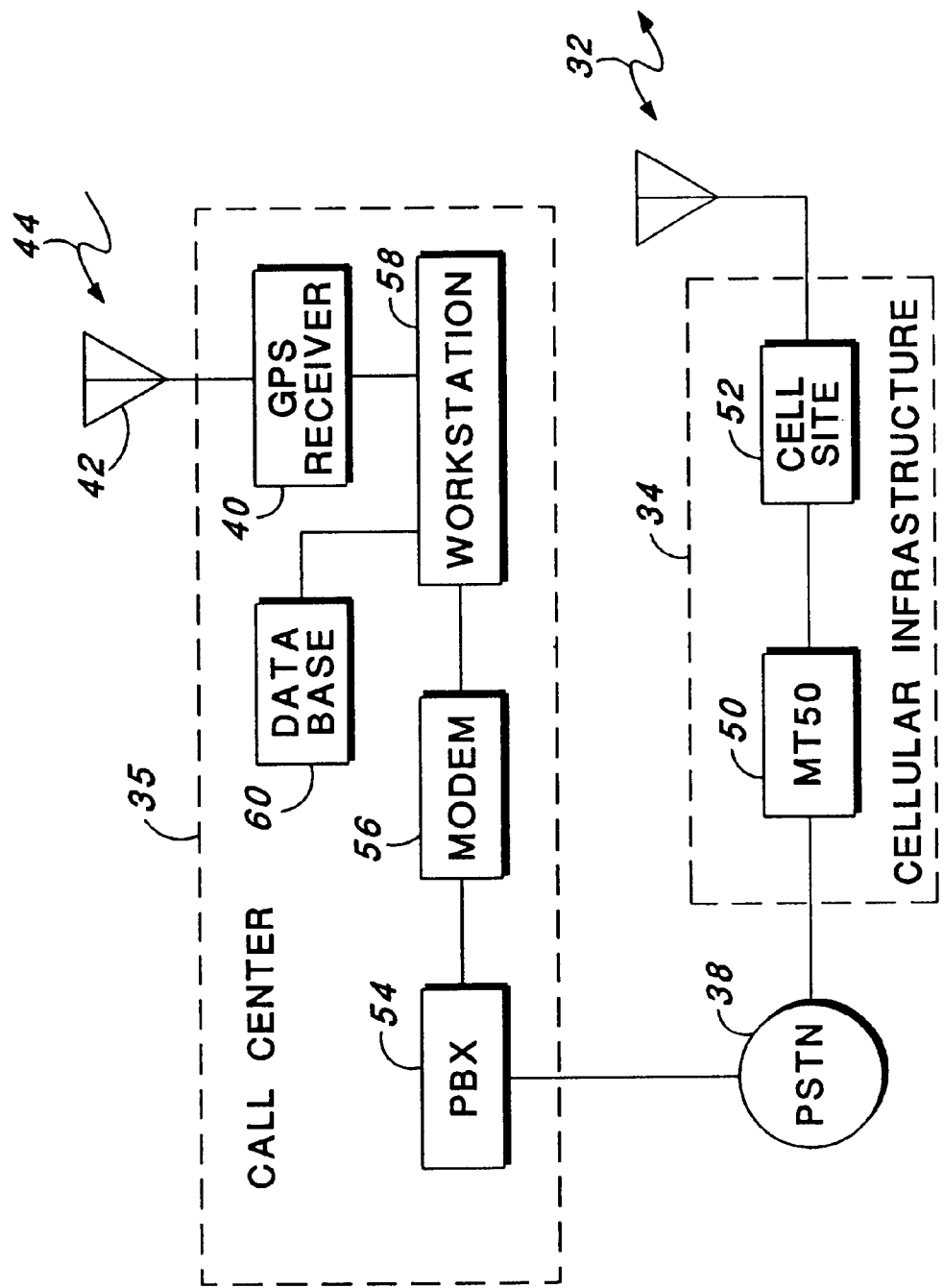
FIG. 2 is a functional block diagram showing the central station, a public switched telephone network, and base station infrastructure in accordance with the embodiment of FIG. 1.

Referring next to FIG. 2, shown is a block diagram of the central station 35, the public switched telephone network 38 and the base station infrastructure 34. The central station 35 is coupled to the base station infrastructure 34 via the public switch telephone network 38.

Within the base station infrastructure 34, the public switched telephone network 38 is coupled to a mobile telephone switching office 50, which is in turn coupled to a cell site 52 and the base station antenna 30.

Within the central station 35, a private branch exchange 54 is connected to the public switched telephone network 38, and to a modem 56. The modem 56 is coupled to a workstation 58, such as a microcomputer, a minicomputer, a mainframe, or a network of one or more such computers. Coupled to a workstation 58 is a database 60 of station identification numbers (STIDs) containing security information associated with each station identification number for verifying that persons wishing to access a particular cellular transceiver via the central station 35 is authorized to access to a particular cellular transceiver. Also shown is the second GPS receiver 40 and the second GPS antenna 42 for receiving GPS signals from a GPS array (not shown) and in particular for receiving the time standard signal therefrom. The time standard signal is passed along to the workstation 58 where the activate/deactivate cycling for a particular cellular transceiver to be accessed is algorithmatically determined.

Thus, the time standard signal used by the workstation is received entirely independently from signals that are transmitted and received via the cellular communication channel 32 utilized by the base station infrastructure 34 to communicate with the cellular transceiver.

Before the central station 35 initiates a communication with the cellular transceiver, the workstation 58 first accesses the database to recall a customer record. Within the customer record is the station identification number (STID) that identifies the cellular transceiver in, for example, a customer's vehicle. The customer record contains the customer's name and other identifying information and also contains a telephone number for the cellular transceiver. The workstation 58 then computes a time at which to access the mobile station based on the cellular transceiver's activate/deactivate cycle. This computation is based on a wakeup interval ($T_w$) and the station identification number of the cellular transceiver. Specifically, the time offset, $T_{off}$=(STID AND OFFh) MOD $T_w$, where "AND" is the Boolean "AND" function, and OFFh is a hexideamal notation for the number 255. For example, if the STID=1000, the $T_w$=10 then STID AND OFFh=E8h, and $T_{off}$=0 E8h MOV 10=2.

A next opportunity to access the cellular transceiver is defined as being $T_{off}$ minutes after an access time period boundary. Specifically, if $T_w$=10 then access time period boundaries fall on the hour, ten minutes after the hour, twenty minutes after the hour, thirty minutes the hour, forty minutes after the hour and fifty minutes after the hour. Thus, for the example, the vehicle access times would be at two, twelve, twenty-two, thirty-two, forty-two and fifty-two minutes after the hour (because $T_{off}$ is 2.) The time offset algorithm is used to spread activation intervals, i.e., opportunities to access cellular transceivers within a population of such transceivers that all of the cellular transceivers are not active simultaneously. This helps to better utilize available bandwidth.

When the workstation 58 determines that the next opportunity to access a particular cellular transceiver is about to arrive, it dials the cellular transceiver's telephone number using the modem 56. The dialing is started just prior to the activation interval to allow for network cut through delays, i.e., delays involved in passing the call through the private branch exchange 54, the public switched telephone network 38, the mobile telephone switching office 50 and the cell site 52. The call arrives via the cellular communication channel 32 to the cellular transceiver just after the cellular transceiver is activated. The call is automatically answered by the cellular transceiver and data exchange via the cellular communication channel 32 can then ensue.

Figure 3:
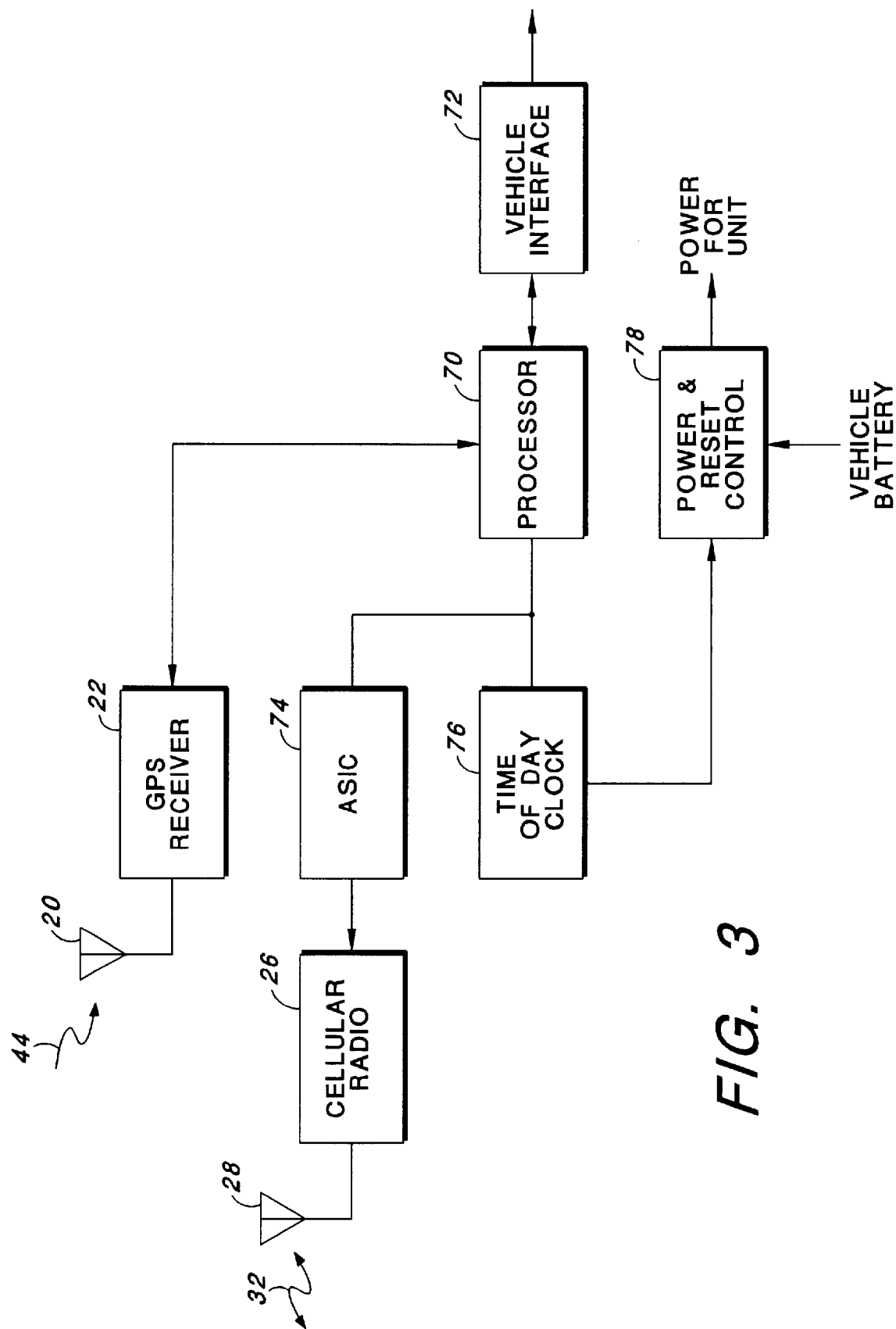
FIG. 3 shows a functional block diagram of the communications device and interface in accordance with the embodiment of FIG. 1.

Referring next to FIG. 3, a block diagram is shown of a communications device and interface useable with the present embodiment of the present invention. Shown is the first GPS receiver 22 and the first GPS antenna 20 coupled via a first data bus to a processor 70. The processor 70 is also coupled via a second data bus to an interface 72, which may be used to control various functions of, for example, a vehicle, such as locking and unlocking a vehicle's doors. A time of day clock 74 and an application specific integrated circuit (ASIC) 76 are also coupled to the processor 70 via a third data bus. The application specific integrated circuit 74 serves as an interface between the processor 70 and the cellular transceiver 26, which is coupled to the cellular communication channel 32 via the cellular antenna 28. The time of day clock 76 receives the time standard signal from the GPS receiver 22 via the processor 70, and controls a power and reset control unit 78. The power and reset control unit 78 determines when power is applied to the cellular transceiver 26, i.e., when the cellular transceiver 26 is activated, and when power is not applied to the cellular transceiver 26, i.e., when the cellular transceiver is deactivated. Note that modification in the cellular transceiver's programming is needed in environments where a power off de-registration is called for, so that discontinuous operation does not result in de-registration every time the cellular transceiver is deactivated by the power and reset control unit 78. Such modification can easily be achieved by the skilled artisan.

The cellular transceiver 26 maintains communications with the central station 35 even when, for example, a vehicle's engine is turned off. During this time, power consumption of the cellular transceiver 26 becomes a critical parameter because available battery current is limited to the extent that a certain amount of battery current must be maintained in order to start the vehicle. To permit operation over an extended period of time, the concept of discontinuous receive is utilized in accordance with the present embodiment, allowing the cellular transceiver to be powered down for periods of time, powering on only briefly to monitor for incoming communications, i.e., pages. As described above, for example, the cellular transceiver 26 may power down for nine minutes and power up for one minute in a repeating cycle, allowing for improved power savings over continuous operation. In order to allow for the use of the concept of discontinuous receive, the cellular transceiver 26 is synchronized with central station 35 so that the cellular transceiver 26 is activated when the central station 35 expects it to be activated. Thus, in accordance with the present embodiment, synchronization is accomplished by having the cellular transceiver read an accurate time of day via the GPS receiver 22, and simultaneously having the central station 35 read this same time of day via a separate GPS receiver 40. The time of day information from the GPS receiver is used to program the time of day clock 76 within the communications device 21.

When the communications device 21 commences discontinuous receive operation it sets the time of day clock 76 to awaken the cellular transceiver 26 at a specific time, and then powers down the cellular transceiver 26. When the specific time arrives, the cellular transceiver 26 is powered back on long enough to monitor for incoming communications from the central station 35, and at the completion of a prescribed period, if no incoming communication is detected, the communications device 21 repeats the power down cycle.

Heretofore, discontinuous receive operation typically required that synchronization be built into control channel protocol operating between the cellular transceiver 26 and the base station infrastructure 34. By directly synchronizing the cellular transceiver 26 and the central station 35 (thus effectively bypassing the cellular communication channel 32 and the base station infrastructure 34 for purposes of synchronization) a need to deviate from standard cellular or other control protocols is eliminated.

Advantageously, the teachings of the present invention are not limited in application to either systems that utilize the global positioning system (GPS) to establish a time standard, or that utilize cellular telephone technologies as their communications topology. Certainly the present invention has application in newly introduced technologies such as the Personal Communications System (PCS) or satellite telephony. Similarly an earth-based time standard may be used, including the employment of very accurate clocks, such as Cs clocks, that are factory synchronized with the central station. Thus, the present invention can properly be characterized as involving the synchronization of two communications systems independently of the particular communications protocol or standard employed.

Thus, for example, consistent with the present invention, the cellular communication channel described above could be used to effect synchronization consistently with the present invention so long as the cellular standards employed were not involved in the synchronization, i.e., the synchronization occurred via communications from the central station to the communications device of which the base station infrastructure was "unaware", i.e., for which the base station performed no function or analysis outside those functions and analysis dictated by the cellular standard employed. Specifically, the base station infrastructure performs no functions or analysis other than those normally performed for the transmission and reception of data or voice signals.

Thus, for example, synchronization could be effected consistently with the present invention via a modem-to-modem communication carried by the communications channel 32 between a modem at the central station and a modem at the communications device with such modem-to-modem communication occurring independently of the base station infrastructure 35 other than as a mode of data or audio transmission.

Figure 4:
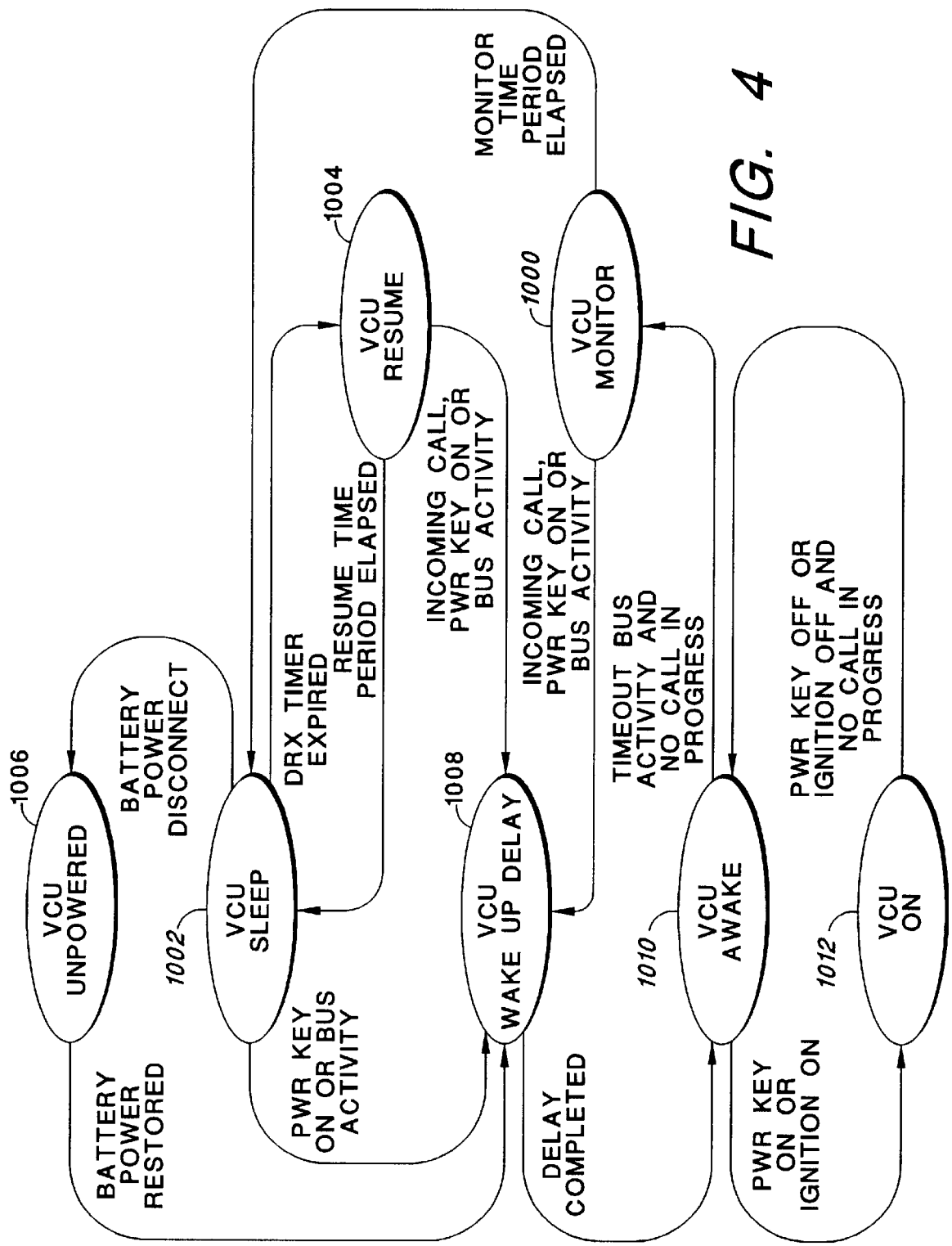
FIG. 4 is a state diagram showing the various states traversed by the communications device of FIG. 3 during operation in accordance with the synchronization approach of the embodiment of FIG. 1.

Referring next to FIG. 4, a state diagram is shown of states traversed by the communications device 21 during operation in accordance with the present embodiment.

Once the time of day clock alarm time is programmed, the communications device 21 exits a VCU monitor state (State 1000) and powers down all circuits in the cellular transceiver 26 or even all circuits in the communications device 21 except the time of day clock 76 and other essential low power circuits, thus entering a VCU sleep state (State 1002). When the time of day clock 76 determines that a period of time during which the cellular transceiver 26 is to stay deactivated has expired, the cellular transceiver 26 powers up into a VCU resume state (State 1004), and monitors the cellular communication channel for a prescribed wakeup period, such as one minute, using normal minimal current draw standby techniques. After the prescribed awake period has expired, the communications device 21 reprograms the time of day clock 76 for a subsequent wakeup period and again powers down into the VCU sleep state (State 1002). This cycle repeats over a prescribed time period as defined by the total amount of current that can be drawn from, for example, a vehicle's battery without jeopardizing its ability to restart the vehicle, after which the communications device 21 ceases discontinuous receive activity the VCU sleep state (State 1002). If battery power is completely removed from the communications device 21, it enters a VCU unpowered state (State 1006) until battery power is restored, e.g., until the vehicle's ignition is started.

If, while the cellular transceiver 26 is powered up into the VCU resume state (State 1004), bus activity is detected by the application specific integrated circuit 74 and processor 70, an incoming call is similarly detected or a power key on the cellular transceiver is depressed, the communications device enters a VCU wakeup delay state (State 1008) during which the communications device 21 waits for devices with which it shows a data bus to power up. Next, following a wakeup delay, the communications device 21 enters the VCU awake state (State 1010) where normal powered operation of the cellular transceiver continues until the application specific integrated circuit 71 and processor 70 detect no bus activity for a timeout period or detect that no cellular telephone call is in progress. When the timeout period expires without any detected bus activity and when a detection is made that there is no call in progress, the communications device 21 returns to the VCU monitor state (State 1000).

If, on the other hand, the power key is depressed or the vehicle's ignition is turned on while the communication device 21 is in the VCU awake state (State 1010), the communications device is put into a VCU on state (State 1012) until the power key is depressed again (to turn the cellular transceiver off) or the ignition is turned off while there is no call in progress, at which time the communications device 21 returns to the VCU awake state (State 1010).

In this way, the present embodiment provides for discontinuous operation of the communications device 21 synchronously with the central station 35 from which transmissions are from time-to-time initiated without a need to revise or even involve the communications standard employed by the base station infrastructure 34 and cellular communication channel 32 in the synchronization of the communications device 21 with the central station 35. In the embodiment described above, it is unnecessary even to involve the base station infrastructure 34 or cellular communication channel 32 in the synchronization of the communications device with the central station.

While the invention herein disclosed has been described by means of specific embodiments and applications thereof, numerous modifications and variations could be made thereto by those skilled in the art without departing from the scope of the invention set forth in the claims.

What is claimed is:

1. An apparatus comprising:
   a wireless receiver that is configured to receive a signal via a wireless connection;
   a time signal receiver that is configured to receive a time of day signal via a connection other than the wireless connection; and
   a controller that is configured to switch said wireless receiver to and from an active mode where said wireless receiver can receive the wireless connection signal and a sleep mode in which said wireless receiver cannot receive the wireless connection signal according to a schedule,
   wherein said controller determines the schedule in accordance with the time of day signal received by said time signal receiver via the connection other than the wireless connection, and
   wherein a sleep mode scheduled for said wireless receiver by said controller is overridden in response to turning on of said apparatus during the scheduled sleep mode, and is overridden in response to existence during the active mode of a wireless connection in progress to said wireless receiver.

2. An apparatus according to claim 1, wherein said time signal receiver is a global positioning system receiver, and the time of day signal is a global positioning system time of day signal.

3. An apparatus according to claim 2, wherein the wireless connection is a cellular connection.

4. An apparatus according to claim 3, wherein the wireless connection signal comprises a signal for controlling operation of a vehicle.

5. An apparatus according to claim 4, wherein the signal for controlling operation of a vehicle comprises a signal for controlling locking or unlocking of the vehicle.

6. An apparatus according to claim 4, wherein the sleep mode is effected by powering down said wireless receiver.

7. An apparatus according to claim 1, wherein another apparatus, which transmits the wireless connection signal to said wireless receiver of said apparatus, also receives the time of day signal, and schedules transmission of the wireless connection signal in accordance with the time of day signal so that said wireless receiver will be in the active mode when the wireless connection signal is transmitted.

8. An apparatus according to claim 1, wherein the sleep mode is effected by powering down said wireless receiver.

9. An apparatus according to claim 1, wherein said controller determines the schedule in accordance with (a) the time of day signal received by said time signal receiver via the connection other than the wireless connection and (b) a station identification number associated with said wireless receiver.

10. A method comprising:
receiving a global positioning system time of day signal by a first communication terminal and by a second communication terminal using respective global positioning system receivers of the first and second communication terminals;
scheduling a power down state and a power up state of a wireless receiver of the first communication terminal in accordance with the time of day signal received by the first communication terminal in said receiving step; and
scheduling transmitting from the second communication terminal to the first communication terminal via a wireless connection to the wireless receiver of the first communication terminal of a control signal for controlling a device coupled to the first communication terminal, in accordance with the time of day signal received by the second communication terminal in said receiving step so that the control signal is transmitted during the power up state of the wireless receiver of the first communication terminal scheduled in said scheduling step,
wherein the power down state for the wireless receiver scheduled in said scheduling step is overridden in response to turning on during the power down state of the device coupled to said first communication terminal, and is overridden in response to existence during the power up state of a wireless connection in progress to the wireless receiver.

11. A method according to claim 10, wherein the device coupled to said first communication is a device of a vehicle.

12. A method according to claim 11, wherein the device is a lock of the vehicle.

13. A method according to claim 10, wherein the wireless connection is a cellular connection.

14. A method according to claim 10, wherein said power down state and power up state scheduling step schedules the power down state and the power up state of the wireless receiver of the first communication terminal in accordance with (a) the time of day signal received by the first communication terminal in said receiving step and (b) a station identification number associated with the wireless receiver of the first communication terminal, and
wherein said transmitting scheduling step schedules the transmitting of the control signal in accordance with (a) the time of day signal received by the second communication terminal in said receiving step and (b) the station identification number associated with the wireless receiver of the first communication terminal.

15. An apparatus comprising:
a wireless transceiver that is configured to receive a signal via a wireless connection;
a time signal receiver that is configured to receive a time of day signal via a connection other than the wireless connection; and
a controller that is configured to switch said wireless transceiver to and from an active mode where said wireless transceiver can receive the wireless connection signal and a sleep mode in which said wireless transceiver cannot receive the wireless connection signal in accordance with a schedule, wherein said controller sets the schedule in accordance with the time of day signal received by said time signal receiver via the connection other than the wireless connection,
wherein another apparatus, which transmits the wireless connection signal to said wireless transceiver of said apparatus, also receives the time of day signal, and schedules transmission of the wireless connection signal in accordance with the time of day signal so that said wireless transceiver will be in the active mode when the wireless connection signal is transmitted,
wherein a sleep mode scheduled for said wireless transceiver by said controller is overridden in response to turning on of said apparatus during the scheduled sleep mode, and is overridden in response to existence during the active mode of a wireless connection in progress to said wireless transceiver.

16. An apparatus according to claim 15, wherein said time signal receiver is a global positioning system receiver, and the time of day signal is a global positioning system time of day signal.

17. An apparatus according to claim 16, wherein the wireless connection is a cellular connection.

18. An apparatus according to claim 17, wherein the wireless connection signal comprises a signal for controlling operation of a vehicle.

19. An apparatus according to claim 18, wherein the signal for controlling operation of a vehicle comprises a signal for controlling locking or unlocking of the vehicle.

20. An apparatus according to claim 15, wherein the sleep mode is effected by powering down said wireless transceiver.

21. An apparatus according to claim 15, wherein said controller sets the schedule in accordance with (a) the time of day signal received by said time signal receiver via the connection other than the wireless connection and (b) a station identification number associated with said wireless transceiver,
wherein the another apparatus schedules transmission of the wireless connection signal in accordance with (a) the time of day signal and (b) the station identification number associated with said wireless transceiver so that said wireless transceiver will be in the active mode when the wireless connection signal is transmitted.

22. A vehicle comprising:

a wireless transceiver that is configured to receive a signal via a wireless connection;

a time signal receiver that is configured to receive a time of day signal via a connection other than the wireless connection; and a controller that is configured to switch said wireless transceiver to and from an active mode where said wireless transceiver can receive the wireless connection signal and a sleep mode in which said wireless transceiver cannot receive the wireless connection signal according to a schedule, wherein said controller sets the schedule in accordance with the time of day signal received by said time signal receiver via the connection other than the wireless connection, wherein an apparatus, which transmits the wireless connection signal to said wireless transceiver of said vehicle, also receives the time of day signal, and schedules transmission of the wireless connection signal in accordance with the time of day signal so that said wireless transceiver will be in the active mode when the wireless connection signal is transmitted, wherein a sleep mode scheduled for said wireless transceiver by said controller is overridden in response to turning on of said vehicle during the scheduled sleep mode, and is overridden in response to existence during the active mode of a wireless connection in progress to said wireless transceiver.

23. A vehicle according to claim 22, wherein said time signal receiver is a global positioning system receiver, and the time of day signal is a global positioning system time of day signal.

24. A vehicle according to claim 23, wherein the wireless connection is a cellular connection.

25. A vehicle according to claim 24, wherein the wireless connection signal comprises a signal for controlling operation of the vehicle.

26. A vehicle according to claim 25, wherein the signal for controlling operation of the vehicle comprises a signal for controlling locking or unlocking of the vehicle.

27. A vehicle according to claim 22, wherein the sleep mode is effected by powering down said wireless transceiver.

28. A vehicle according to claim 22, wherein said controller sets the schedule in accordance with (a) the time of day signal received by said time signal receiver via the connection other than the wireless connection and (b) a station identification number associated with said wireless transceiver, wherein the apparatus schedules transmission of the wireless connection signal in accordance with (a) the time of day signal and (b) the station identification number associated with said wireless transceiver so that said wireless transceiver will be in the active mode when the wireless connection signal is transmitted.

* * * * *